United States Patent
Sweitzer et al.

(10) Patent No.: US 7,089,529 B2
(45) Date of Patent: Aug. 8, 2006

(54) SYSTEM AND METHOD FOR CREATING REUSABLE MANAGEMENT INSTRUMENTATION FOR IT RESOURCES

(75) Inventors: John W. Sweitzer, Austin, TX (US); Douglas A. Wood, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 10/227,966

(22) Filed: Aug. 26, 2002

(65) Prior Publication Data

US 2004/0040031 A1 Feb. 26, 2004

(51) Int. Cl.
- G06F 9/44 (2006.01)
- G06F 7/00 (2006.01)
- G06F 17/30 (2006.01)
- G06F 3/00 (2006.01)

(52) U.S. Cl. .................. 717/104; 707/10; 719/328
(58) Field of Classification Search .............. 717/107, 717/108; 707/10, 103; 709/222; 719/328
See application file for complete search history.

(56) References Cited

U.S. PATENT DOCUMENTS

| | | | | |
|---|---|---|---|---|
| 5,848,273 A | * | 12/1998 | Fontana et al. | 717/108 |
| 6,012,067 A | * | 1/2000 | Sarkar | 707/103 R |
| 6,023,579 A | | 2/2000 | Hellgren et al. | 395/702 |
| 6,101,325 A | | 8/2000 | Flaat | 395/705 |
| 6,185,730 B1 | | 2/2001 | LeBlanc | 717/1 |
| 6,199,195 B1 | | 3/2001 | Goodwin et al. | 717/1 |
| 6,212,673 B1 | | 4/2001 | House et al. | 717/1 |
| 6,226,788 B1 | | 5/2001 | Schoening et al. | 717/6 |
| 6,230,309 B1 | | 5/2001 | Turner et al. | 717/1 |
| 6,230,318 B1 | | 5/2001 | Halstead et al. | 717/10 |
| 6,263,485 B1 | | 7/2001 | Schofield | 717/1 |
| 6,275,979 B1 | | 8/2001 | Graser et al. | 717/2 |
| 6,289,500 B1 | | 9/2001 | Baxter et al. | 717/1 |
| 6,305,007 B1 | | 10/2001 | Mintz | 717/1 |
| 6,311,321 B1 | | 10/2001 | Agnihotri et al. | 717/1 |
| 6,711,579 B1 | * | 3/2004 | Balakrishnan | 707/102 |

* cited by examiner

Primary Examiner—Wei Zhen
Assistant Examiner—Chih-Ching Chow
(74) Attorney, Agent, or Firm—VanLeeuwen & Vanleeuwen; Gerald R. Woods

(57) ABSTRACT

A system and method for creating reusable management instrumentation for information technology (IT) resources is presented. Management instrumentation accesses a resource using an instrumentation library type (ILT) and an access path. The ILT is a basic programming model to access a resource, such as SQL and shell scripts. The ILT may be a resource specific ILT, a command ILT, or an object ILT. A resource specific ILT is used to access a specific resource. A command ILT is used in conjunction with an access path to access a particular resource. Management instrumentation re-uses command ILT's by selecting different access paths to combine with the command ILT to access different resources. An object ILT allows management instrumentation to communicate with object-based resource interfaces, such as with management beans. A translation table may be used in conjunction with an object ILT to allow the object ILT to communicate with the object-based resource interface.

25 Claims, 7 Drawing Sheets

| Property | Access Mechanism | Access Path |
|---|---|---|
| Property D | A | D |
| Property E | A | E |
| Property F | A | F |

SYSTEM AND METHOD FOR CREATING REUSABLE MANAGEMENT INSTRUMENTATION FOR IT RESOURCES

BACKGROUND OF THE INVENTION

1. Technical Field

The present invention relates in general to a system and method for creating reusable management instrumentation for information technology. More particularly, the present invention relates to a system and method for combining generic access mechanisms with specific access paths to communicate with specific resources.

2. Description of the Related Art

Information technology (IT) resource management involves creating a model of the resource for use by a management tool to determine what properties a resource exposes to the management tool. The model is instrumented by providing code for each property in the model. The code allows a management tool to interact with the resource as described by the model. The instrumentation (i.e. provider) converts the raw interface provided by a resource into a form usable by a management tool.

Each property has a provider that includes information necessary to allow the management tool to interact with the property. A single provider may provide many properties. Typically, a provider works for a single class. In many cases, however, properties may require multiple providers based upon a desired operation, and providers may be combined into larger blocks of code that use a property name to determine a correct action.

Instrumentation is the mechanism a management tool uses to examine and manipulate a resource. Instrumentation may take many forms, such as standards-based access, resource proprietary application program interfaces (API's), and third party instrumentation. Standards-based access has properties stored in a repository that may be an industry standard or de-facto standard access protocol, such as Win32 registry, lightweight directory access protocol (LDAP), and Structured Query Language (SQL). Resource proprietary API's define, a proprietary API corresponding to a resource. Accessing management properties of a resource proprietary API often involves linking to libraries provided by the resource vendor and may involve information pre-processing for management tool compatibility. Third party instrumentation often adds value to a resource by creating additional instrumentation for a proprietary management interface. Third party instrumentation is often provided in an easily accessible form such as shell scripts.

In each of these cases, the instrumentation provides a bridge between management and manageability. A challenge found with existing art is maintaining independence of a management tool while supporting different types of interfaces.

Many attempts are made to standardize instrumentation interfaces. A challenge with existing attempts is that they place the burden of implementing a standard interface on the resource or they mix efforts of developing a standard instrumentation interface with efforts to develop a standard resource model.

What is needed, therefore, is a way to develop instrumentation which allows a management tool to manage a resource without alteration of either the management tool or the resource.

SUMMARY

It has been discovered that instrumentation bridges a communication gap between a management tool and a resource by creating generic access mechanisms and using specific access paths to communicate with a specific resource. Instrumentation includes an access mechanism and an access path. The access mechanism is a basic programming model the resource interface uses to expose an instance, such as SQL. The access path is the instruction required by an access mechanism to access a specific instance. The access mechanism may be used in conjunction with different access paths to access different instances.

The management tool receives a request to access a resource. The management tool checks an access table to determine if the resource is registered. The access table includes a list of registered resources with corresponding access mechanism identifiers and access path identifiers. An access mechanism identifier corresponds to an access mechanism to use to communicate with the resource, such as SQL, shell scripts, and Java classes. An access path identifier corresponds to an instruction set which includes information that the access mechanism uses to access a particular resource.

If the resource is registered, the management tool retrieves the corresponding access mechanism, and combines it with the corresponding instruction set. For example, the access mechanism may be an SQL programming model and the access path includes information for the SQL programming model to access the particular resource. The management tool creates a request using the selected access mechanism and selected instruction set and sends the request to the corresponding resource.

When the management tool receives a request corresponding to a second resource, the management tool is able to communicate with the second resource by re-using the access mechanism and combining the access mechanism with a second instruction set. The management tool is also able to use object models when a target resource uses an object interface with a pre-defined interface, such as a management bean. A translation table is used to map between the resource model and the management tool model in situations where translation is needed in order to communicate with each other.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 3A is an access table showing which access mechanisms and access paths to use for accessing a particular instance;

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
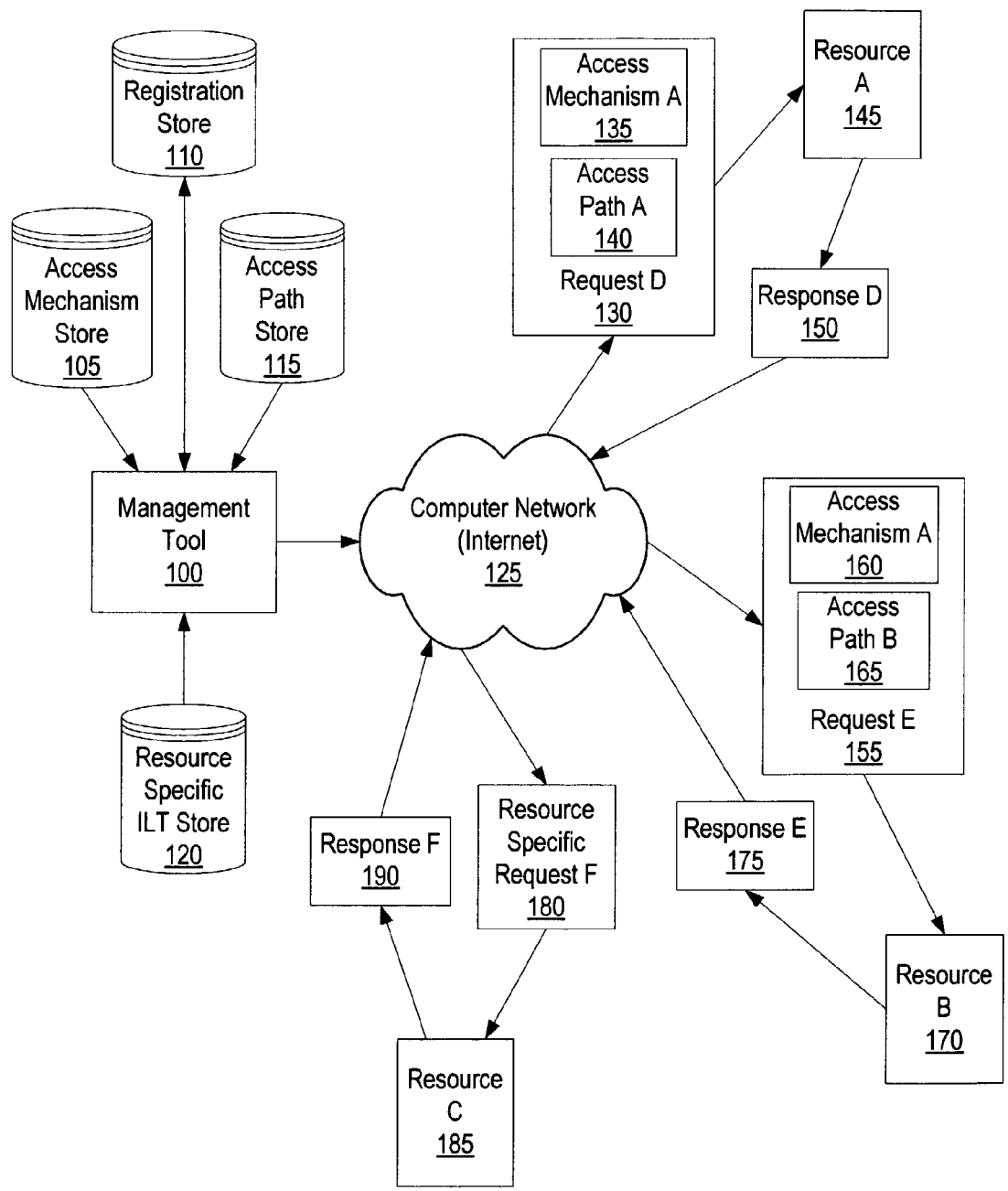
FIG. 1 is a high-level diagram showing a management tool sending requests to various resources.

FIG. 1 is a high-level diagram showing a management tool sending requests to various resources. Management tool 100 receives a request to access resource A 145. Management tool 100 checks an access table in registration store 110 to determine if resource A 145 is registered. The access table includes a list of registered resources with corresponding access mechanism identifiers and access path identifiers (see FIG. 3A and corresponding text for further details regarding access table properties). Registration store 110 may be stored on a non-volatile storage area, such as a computer hard drive.

If resource A 145 is registered with management tool 100, management tool 100 uses resource A 145's corresponding access mechanism identifier to retrieve the correct access mechanism, or instrumentation library type (ILT), from access mechanism store 105. The ILT may be a command ILT, a resource specific ILT, or an object ILT. A command ILT is an ILT that uses a mapping string to describe how a specific operation, such as reading a property, is performed against a resource. For example, a command ILT may be an SQL programming model. A resource specific ILT is an ILT with embedded instructions to access a specific resource. An object ILT is an ILT to interface with a resource that uses object interfaces, such as a management bean. Access mechanism store 105 may be stored on a non-volatile storage area, such as a computer hard drive.

Management tool 100 identifies resource A 145's access path identifier located in the access table and retrieves the corresponding access path from access path store 115. The access path is a piece of data, or instruction set, that is opaque to management tool 100. The access path is bound to schema elements as part of an instrumentation declaration in a resource model. When management tool 100 invokes an operation using an access mechanism, management tool 100 provides the access path corresponding to the requested resource. The intent of the access path is to allow generic instrumentation (i.e. an access mechanism) to be adapted to a specific resource. The information necessary to use an access mechanism to access a specific instance within a resource is encoded in the access path. Access path store 115 may be stored on a non-volatile storage area, such as a computer hard drive.

Management tool 100 creates request D 130 using access mechanism A 135 and access path 140. Management tool 100 sends request D 130 to resource A 145 through computer network 125, such as the Internet. Resource A 145 analyzes request D 130 and sends response D 150 to management tool 100 through computer network 125.

Management tool 100 receives a second request to access resource B 170. Management tool checks the access table in registration store 110 to determine if resource B 170 is registered. If resource B 170 is registered with management tool 100, management tool 100 uses a corresponding access mechanism identifier to retrieve the correct access mechanism from access mechanism store 105. Management tool 100 also uses a corresponding access path identifier to retrieve the correct access path from access path store 115.

Management tool 100 creates request E 155 using access mechanism A 160 and access path 165. Access mechanism A 160 is the same as access mechanism A 135 and management tool 100 uses different access paths to distinguish which resource to send the request. Management tool 100 sends request E 155 to resource B 170 through computer network 125, such as the Internet. Resource B 170 analyzes request E 155 and sends response E 175 to management tool 100 through computer network 125.

Management tool 100 receives a third request to access resource C 185. Management tool checks the access table in registration store 110 to determine if resource C 185 is registered. Management tool 100 identifies that a resource specific ILT identifier corresponds to resource C 185. A resource specific ILT is intended to access a single resource. The resource specific ILT may have access path information hard coded in the ILT and may not require a mapping string.

Management tool 100 retrieves the corresponding resource specific ILT from resource specific ILT store 120. Resource specific ILT store 120 may be stored on a non-volatile storage area, such as a computer hard drive. Management tool sends resource specific request F 180 to resource C 185 through computer network 125, such as the Internet. Resource C 185 analyzes the request, and sends response F 190 to management tool 100 through computer network 125.

In one embodiment, management tool 100 may perform object mapping by using an object ILT. The object ILT uses a protocol, such as SNMP (simple network management protocol) and LDAP, to communicate with an object-based resource interface. Management tool 100 uses a translation table to resolve inconsistencies between the object ILT and the object-based resource interface.

Figure 2:
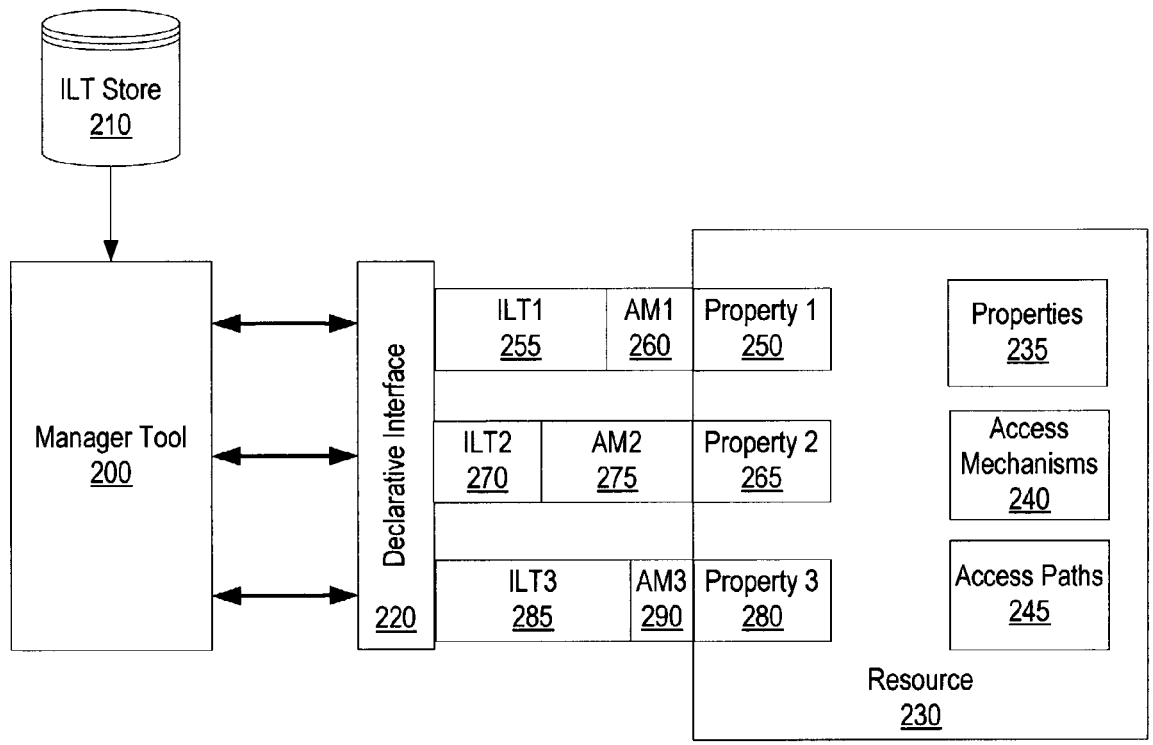
FIG. 2 is a diagram showing instrumentation library types (ILT's) bridging the gap between a management tool interface and a resource interface.

FIG. 2 is a diagram showing instrumentation library types (ILT's) bridging the gap between a management tool interface and a resource interface. Manager tool 200 is used to access instances in resource 230. Manager tool 200 includes declarative interface 220 which is a standard interface that manager tool 200 uses to access various resources.

Resource 230 includes properties 235, access mechanism 240, and access paths 245 which are inherent within resource 230 and are used by resource 230 to provide external access capabilities. Resource 230 provides three mechanisms which are access mechanism 1 260, access mechanism 2 275, and access mechanism 3 290 for accessing three separate properties within resource 230. These properties are property 1 250, property 2 265, and property 3 280, respectively.

Resource 230's access mechanisms may not completely match up with declarative interface 220. Therefore, instrumentation library types (ILT's) are used to bridge the gap between declarative interface 200 and resource 230's access mechanisms. Manager tool 200 retrieves ILT's from ILT store 210. The ILT's retrieved correspond to resource 230's access mechanisms. ILT 1 255 is used to communicate with property 1 250. ILT 2 270 is used to communicate with property 2 265. ILT 3 285 is used to communicate with property 3 280. ILT 1 255, ILT 2 270, and ILT 3 285 may be the same ILT, such as an SQL ILT, or may be different ILT's. Manager tool 200 uses mapping strings to direct the ILT's as to which properties to access (see FIG. 5 and corresponding text for further details regarding mapping strings).

FIG. 3A is an access table showing which access mechanisms and access paths to use for accessing a particular property. Access table 300 includes property column 310, access mechanism column 320, and access path column 330. Property column 310 includes a list of registered properties. The example shown in FIG. 3A includes registered property D, property E, and property F.

Access mechanism column 320 includes access mechanism identifiers corresponding to the registered properties located in property column 310. The access mechanism identifier identifies a basic programming model a resource interface uses to expose the corresponding property. For example, SQL, shell scripts, Java class, and SNMP are types of access mechanisms. The access mechanism identifier informs processing as to which access mechanism, or instrumentation library type (ILT), to use to access the corresponding property. In one embodiment, the access mechanism identifier may correspond to an object ILT when a management tool uses object mapping to access a target resource that uses an object interface with a pre-defined interface, such as a management bean.

Access path column 330 includes access path identifiers corresponding to the properties located in property column 310. The access path identifiers identify which mapping string, or instruction set, to use to access the corresponding property. The mapping string includes instructions required by the corresponding access mechanism to access a specific property.

The mapping string is a piece of data that is opaque to a management tool that is passed into each ILT operation. Mapping strings are bound to schema elements as part of the instrumentation declaration in the resource model. When an ILT manager invokes an operation, the ILT manager provides the correct mapping string. Access table 300 allows the ILT manager to select the correct mapping string corresponding to a property. The intent of the mapping string is to allow generic instrumentation to be adapted to a specific resource type. For example, a property that uses SQL as the access mechanism may have a "select" statement for its access path. Access table 300 shows that processing uses access mechanism A and access path D to access property D. Using the object ILT embodiment described above, the mapping string may be used to specify an identity translation table that resolves inconsistencies between the Object ILT and the target resource model.

Figures 3, 3B:
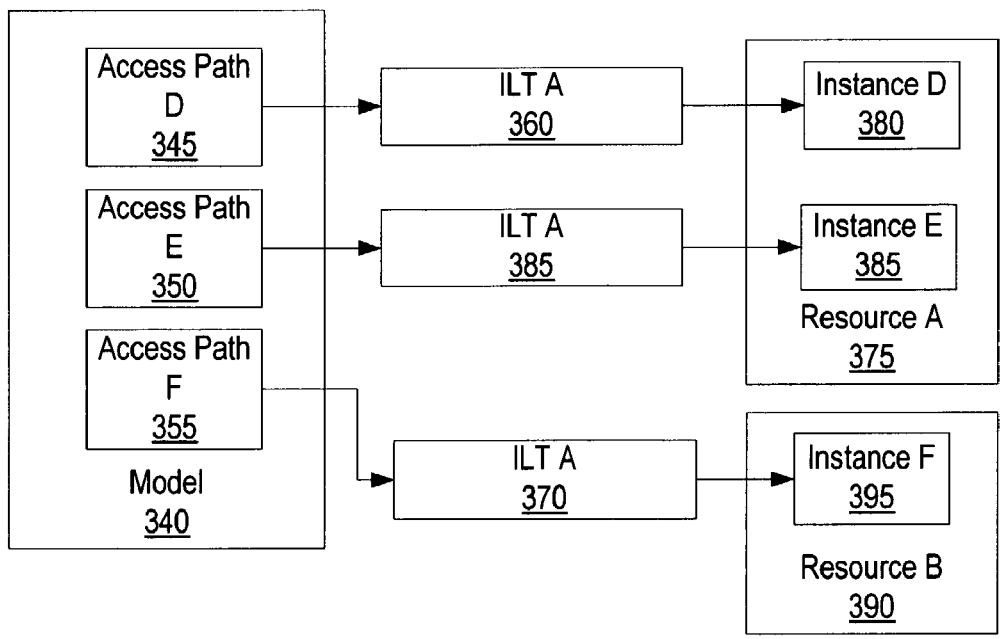
FIG. 3B is a diagram showing a management model using a single access mechanism to access multiple instances.

FIG. 3B is a diagram showing a management model using a single access mechanism to access multiple instances. Model 340 includes access path D 345, access path E 350, and access path F 355. Each access path allows model 340 to examine and manipulate different instances.

Model 340 uses instrumentation library type (ILT) A to access instance D 380, instance E 385, and instance F 395. For example, ILT A may be an SQL programming model. Model 340 uses different access paths to distinguish which instance to access. Resources may have different instances which use the same access mechanism. For example, FIG. 3B shows that model 340 uses ILT A 360 with access path D 345 to access instance D 380 located in resource A 375. Model 340 also uses ILT A 385 with access path E 350 to access instance E 385 also located in resource A 375.

Different resources may be accessed using the same ILT. For example, FIG. 3B shows that model 340 uses ILT A 370 with access path F 355 to access instance F 395 located in resource B 390. ILT's are stored in a storage area and are retrieved for use when a specific instance is being accessed.

Figure 4:
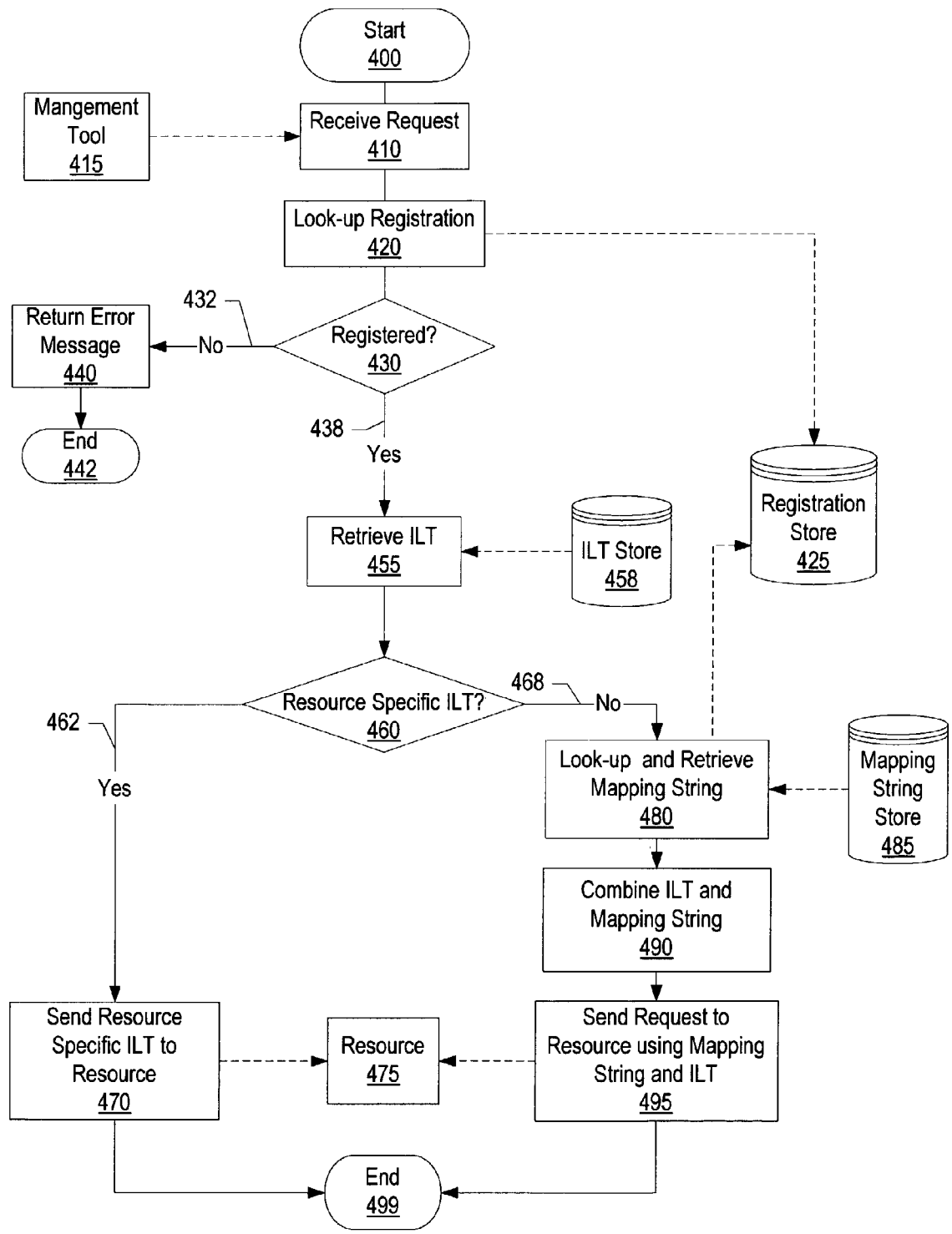
FIG. 4 is a flowchart showing steps taken in sending a request to a resource.

FIG. 4 is a flowchart showing steps taken in sending a request to a resource. Processing commences at 400, whereupon processing receives a request from management tool 415. Processing looks up registration information corresponding to the request in registration store 425 (step 420). For example, the request may be a request to access "instance I" in "resource R" and processing checks to see if accessing "instance I" in "resource R" is registered. Registration store 425 may be stored on a non-volatile storage area, such as a computer hard drive. A determination is made as to whether the corresponding instance is registered (decision 430). If the instance is not registered, decision 440 branches to "No" branch 432 whereupon an error message is returned (step 440) and processing ends at 442.

On the other hand, if the instance is registered, decision 430 branches to "Yes" branch 438 whereupon an instrumentation library type (ILT) corresponding to the instance is retrieved from ILT store 458. ILT store 458 may be stored on a non-volatile storage area, such as a computer hard drive.

A determination is made as to whether the ILT is a resource specific ILT (decision 460). In one embodiment, the management tool determines whether a corresponding mapping string is registered and may not determine whether the ILT is a resource specific ILT. A resource specific ILT is an ILT which includes a mapping string and is intended for a single instance. The ILT may also be a command ILT or an object ILT. A command ILT is a generic ILT that uses an access path to communicate with a specific resource. An object ILT is an ILT to interface with a resource that uses object interfaces, such as a management bean.

If the ILT is a resource specific ILT, decision 460 branches to "Yes" branch 462 whereupon the request is sent to resource 475 using the resource specific ILT (step 470). On the other hand, if the ILT is a command ILT or an object ILT, decision 460 branches to "No" branch 468 whereupon a corresponding mapping string is retrieved from mapping string store 485 (step 480). The mapping string may be a translation table in the case of an object ILT or the mapping string may be a set of command strings in the case of a command ILT. Processing uses an access table located in registration store 425 to identify the proper mapping string to retrieve (see FIG. 3A and corresponding text for further details regarding access table properties). Mapping string store 485 may be stored on a non-volatile storage area, such as a computer hard drive.

Processing combines the ILT with the mapping string at step 490. Processing sends the request to resource 475 using the ILT at step 495. Processing ends at 499.

Figure 5:
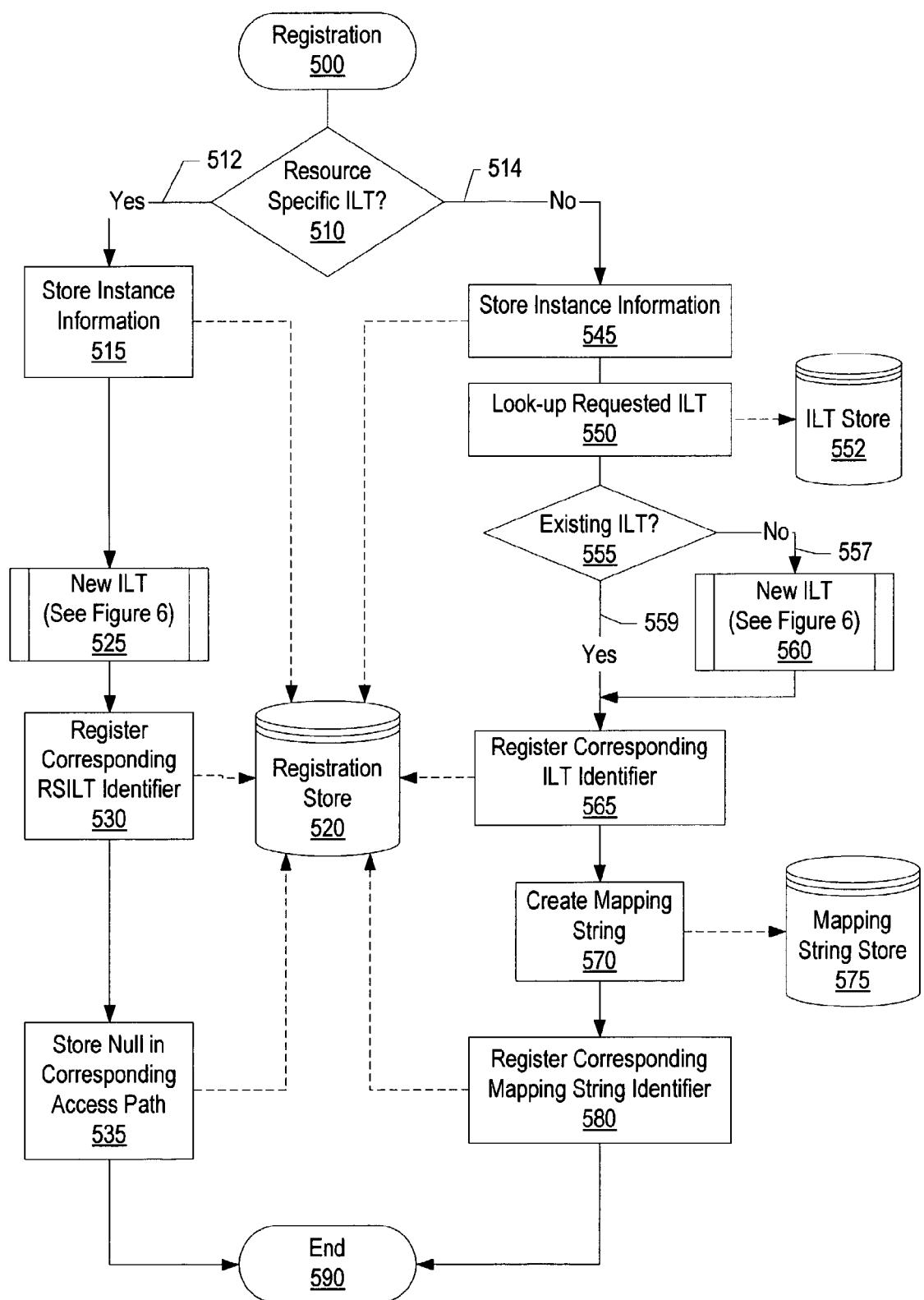
FIG. 5 is a flowchart showing steps taken in registering an instance request.

FIG. 5 is a flowchart showing steps taken in registering an instance request. Registration processing commences at 500, whereupon a determination is made as to whether the registration corresponds to a resource specific instrumentation library type (ILT) (decision 510). A resource specific ILT is an ILT which is intended for a single instance. If the registration corresponds to a resource specific ILT, decision 510 branches to "Yes" branch 512 whereupon processing stores instance information in an access table located in registration store 520 at step 515 (see FIG. 3A and corresponding text for further details regarding access table properties). Instance information may include an instance identifier and its target resource name.

Figure 6:
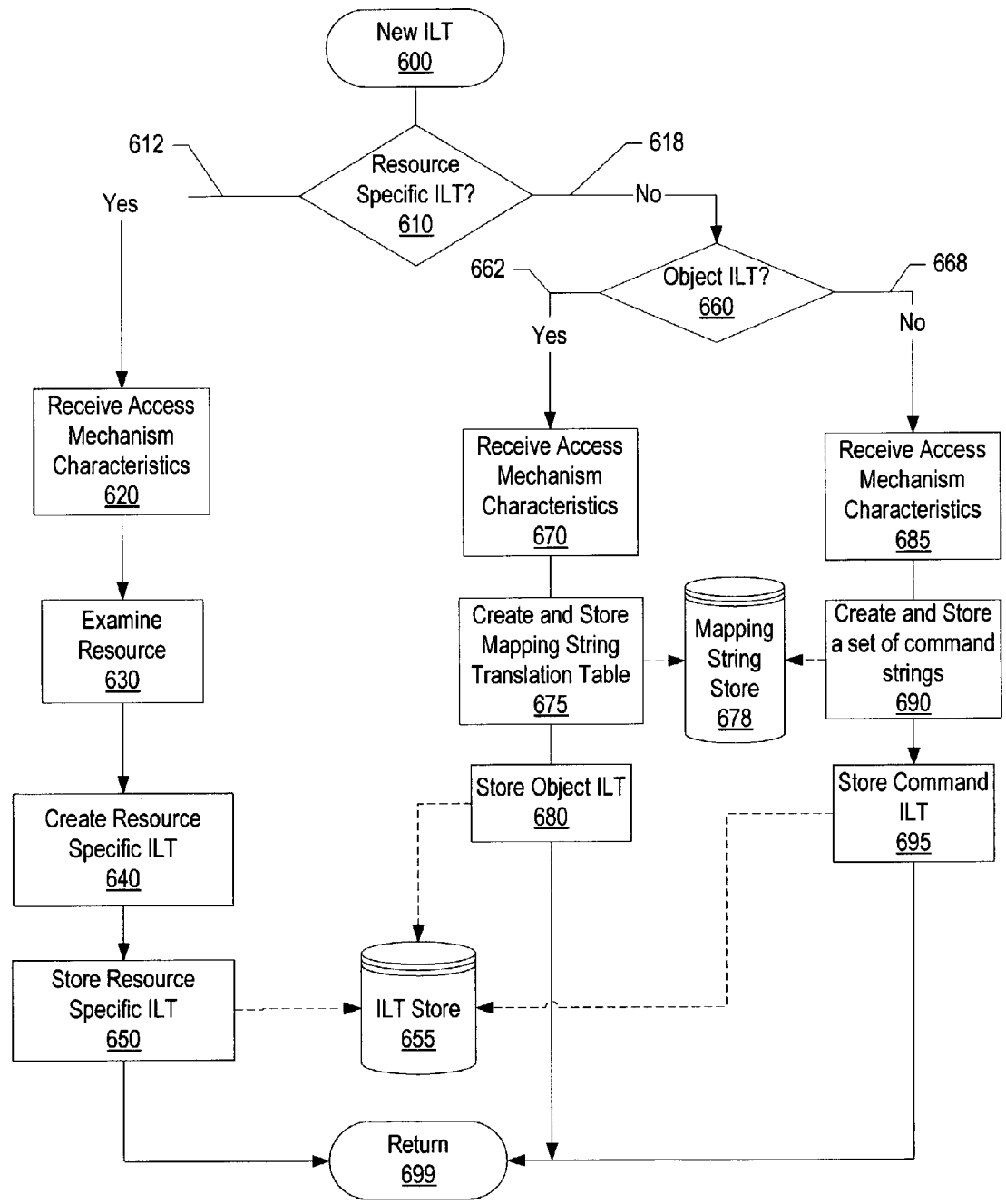
FIG. 6 is a flowchart showing steps taken in generating a new instrumentation library type (ILT)

Processing generates a new resource specific ILT (pre-defined process block 525, see FIG. 6 and corresponding text for further details). Processing stores the new resource specific ILT identifier in the access table corresponding to the instance identifier (step 530). The resource specific ILT identifier provides location information of the resource specific ILT. Processing stores a null in an access path location corresponding to the resource specific ILT identifier in the access table (step 535). A null is stored in the access path location because resource specific ILT's have embedded mapping instructions specific to a particular resource.

On the other hand, if the registration does not correspond to a resource specific ILT, decision 510 branches to "No" branch 514 whereupon instance information is stored in the access table located in registration store 520 at step 545. For example, instance information may include an instance identifier corresponding to the registering instance. Processing looks-up an ILT in ILT store 552 corresponding to the request (step 550). For example, if the request calls for an SQL access mechanism, processing looks for an SQL access mechanisms in ILT store 552. The ILT may be an object ILT or a command ILT. ILT store 552 may be stored on a non-volatile storage area, such as a computer hard drive.

A determination is made as to whether processing located an ILT corresponding to the request (decision 555). If processing did not locate a corresponding ILT, decision 555 branches to "No" branch 557 whereupon a new ILT is generated (pre-defined process block 560, see FIG. 6 and corresponding text for further details). On the other hand, if processing locates the corresponding ILT, decision 555 branches to "Yes" branch 559 bypassing new ILT generation steps.

Processing registers the corresponding ILT identifier in the access table located in registration store 520. The ILT identifier informs processing as to which ILT to use to communicate with the corresponding instance. A mapping string is created at step 570 and stored, in mapping string store 575. The mapping string includes information that allows processing to use a command ILT to communicate with a specific instance. The mapping string is registered in registration store 520 at step 580. Mapping string registration includes storing a mapping string identifier in an access path field corresponding to the instance identifier located in the access table. Registration processing ends at 590.

FIG. 6 is a flowchart showing steps taken in generating a new instrumentation library type (ILT). New ILT processing commences at 600, whereupon a determination is made as to whether the new ILT is a resource specific ILT. A resource specific ILT is different from a command ILT or an object ILT in that the resource specific ILT is targeted for a specific resource, whereas a command ILT and an object ILT are used to communicate with one or more resources. If the new ILT is a resource specific ILT, decision 610 branches to "Yes" branch 612 whereupon processing receives access mechanism characteristics from a user at (step 620). For example, the user may wish to interface with a specific instance using a C API.

Processing examines the resource at step 630 to identify access path characteristics of the resource. Processing generates a resource specific ILT using identified information from examining the resource along with the user's information (step 640). The resource specific ILT is stored in ILT store 655 for future use (step 650). ILT store 655 may be stored on a non-volatile storage area, such as a computer hard drive.

On the other hand, if the new ILT is not a resource specific ILT, decision 610 branches to "No" branch 618 whereupon a determination is made as to whether the ILT is an object ILT or a command ILT. If the ILT is an object ILT, decision 660 branches to "Yes" branch 662 whereupon processing receives access mechanism characteristics at step 670. Processing creates and stores a mapping string translation table in mapping string store 678 (step 675). Mapping string, store 678 may be stored on a non-volatile storage area, such as a computer hard drive. When using object mapping, a translation table may be used to resolve inconsistencies between a management model and an external resource model. The object ILT is stored in ILT store 655 at step 680.

On the other hand, if the new ILT is not an object ILT, decision 660 branches to "No" branch 668 whereupon processing creates a command ILT. Processing receives access mechanism characteristics at step 685. For example, a user may wish to interface with multiple resources which have a C API and the wishes to create a reusable command ILT. Processing creates and stores a set of command strings in mapping string store 678 (step 690). The set of command strings are generated by examining the resource and user input. The command ILT is stored in ILT store 655 at step 695. Processing returns at 699.

Figure 7:
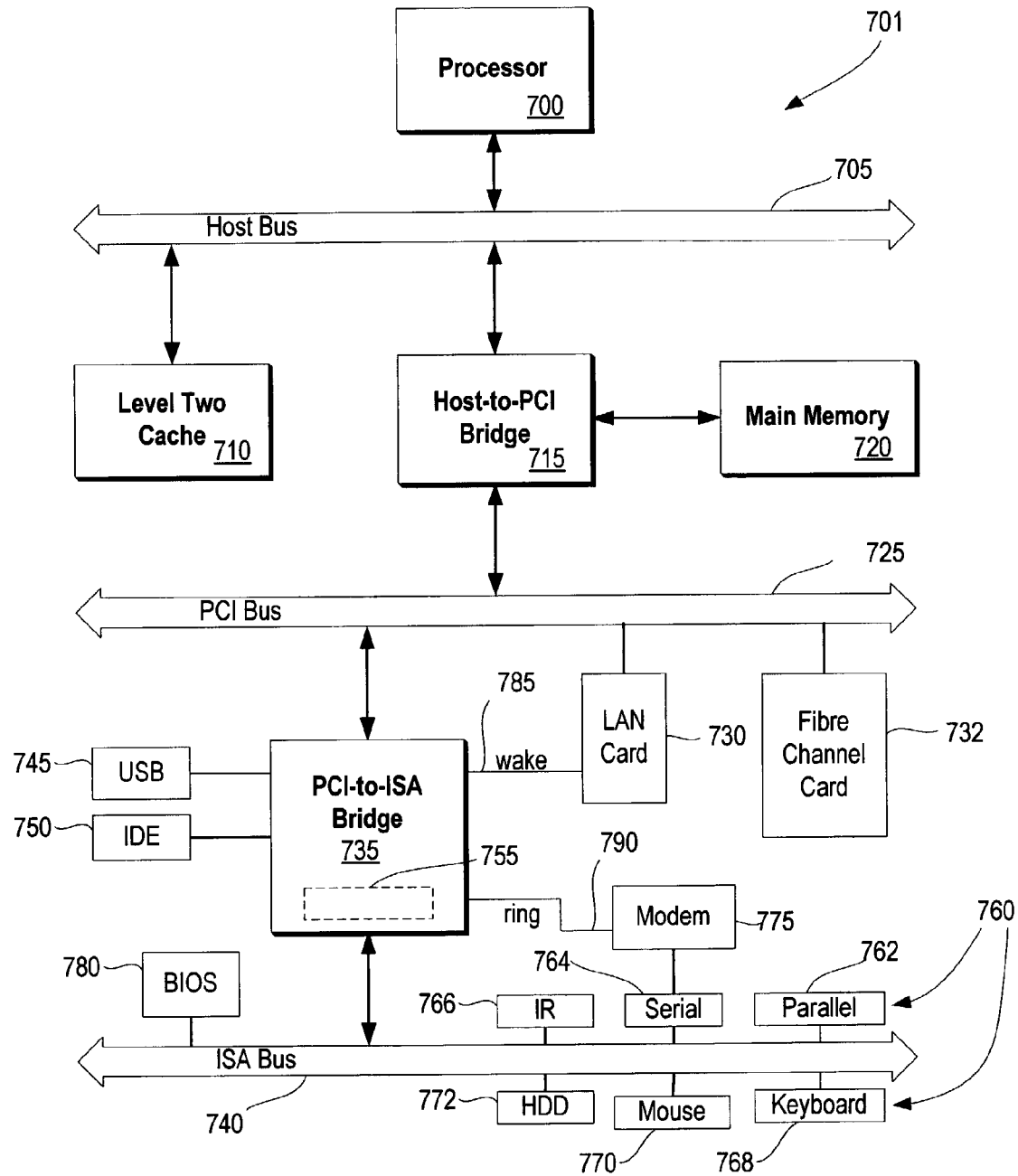
FIG. 7 is a block diagram of an information handling system capable of implementing the present invention.

FIG. 7 illustrates information handling system 701 which is a simplified example of a computer system capable of performing the invention described herein. Computer system 701 includes processor 700 which is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730. PCI-to-ISA bridge 735 provides bus control to, handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input/output (I/O) devices can be attached to various interfaces 760 (e.g., parallel interface 762, serial interface 764, infrared (IR) interface 766, keyboard interface 768, mouse interface 770, and fixed disk (HDD) 772) coupled to ISA bus 740. Alternatively, many I/O devices can be accommodated by a super I/O controller (not shown) attached to ISA bus 740.

BIOS 780 is coupled to ISA bus 740, and incorporates the necessary processor executable code for a variety of low-level system functions and system boot functions. BIOS 780 can be stored in any computer readable medium, including magnetic storage media, optical storage media, flash memory, random access memory, read only memory, and communications media conveying signals encoding the instructions (e.g., signals from a network). In order to attach computer system 701 to another computer system to copy files over a network, LAN card 730 is coupled to PCI bus 725 and to PCI-to-ISA bridge 735. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the invention described herein, this computer system is simply one example of a computer system. Those skilled in the art will appreciate that many other computer system designs are capable of performing, the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk, (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method for managing a resource, said method comprising:
   receiving a request, the request corresponding to a property;
   selecting an access mechanism corresponding to the property from a plurality of access mechanisms, wherein each of the plurality of access mechanisms corresponds to a different programming model;
   identifying mapping string corresponding to the property;
   combining the access mechanism with the mapping string, the combination resulting in a property request; and
   performing the property request.

2. The method as described in claim 1 wherein the access mechanism is selected from the group consisting of a command instrumentation library type and an object instrumentation library type.

3. The method as described in claim 1 wherein the access mechanism is a command instrumentation library type and wherein the mapping string includes an access path.

4. The method as described in claim 1 wherein the access mechanism is an object instrumentation library type and wherein the mapping string includes a translation table.

5. The method as described in claim 1 wherein the request includes a property identifier, the method further comprising:
   locating the property identifier in an access table; and
   retrieving the access mechanism and the mapping string from the access table based upon the Located property identifier.

6. The method as described in claim 1 further comprising:
   receiving a property registration request, the property registration request including a property identifier;
   storing the property identifier in an access table, the property identifier corresponding to a new property;
   selecting a different access mechanism included in the plurality of access mechanisms for the property identifier, the different access mechanism corresponding to an access mechanism identifier;
   generating a different mapping string corresponding to the new property, the different mapping string corresponding to a mapping string identifier; and
   storing the mapping string identifier and the access mechanism identifier in the access table corresponding to the property identifier.

7. The method as described in claim 6 wherein the selecting further comprises:
   determining that a valid access mechanism does not exist;
   receiving access mechanism characteristics corresponding to the property registration request in response to the determination; and generating the different access mechanism using the access mechanism characteristics.

8. An information handling system comprising:
   one or more processors;
   a memory accessible by the processors;
   one or more nonvolatile storage devices accessible by the processors;
   a resource management tool to interface with a resource, the resource management tool including:
      receiving logic for receiving a request, the request corresponding to a property;
      selection logic for selecting an access mechanism corresponding to the property from a plurality of access mechanisms, wherein each of the plurality of access mechanisms corresponds to a different programming model;
      identification logic for identifying a mapping string corresponding to the property;
      combination logic for combining the access mechanism with the mapping string, the combination resulting in a property request; and
      invocation logic for invoking the property request.

9. The information handling system as described in claim 8 wherein the access mechanism is selected from the group consisting of a command instrumentation library type and an object instrumentation library type.

10. The information handling system as described in claim 8 wherein the access mechanism is a command instrumentation library type and wherein the mapping string includes an access path.

11. The information handling system as described in claim 8 wherein the access mechanism is an object instrumentation library type and wherein the mapping string includes a translation table.

12. The information handling system as described in claim 8 wherein the request includes a property identifier, the information handling system further comprising:
   location logic for locating the property identifier in an access table; and retrieval logic for retrieving the access mechanism and the mapping string from the access table based upon the located property identifier.

13. The information handling system as described in claim 8 further comprising: receiving logic for receiving a property registration request, the property registration request including a property identifier;
storage logic for storing the property identifier in an access table, the property identifier corresponding to a new property;
selection logic for selecting a different access mechanism included in the plurality of access mechanisms for the property identifier, the access mechanism corresponding to an access mechanism identifier;
generation logic for generating a different mapping string corresponding to the new property, the different mapping string corresponding to a mapping string identifier; and
storage logic for storing the mapping string identifier and the access mechanism identifier in the access table corresponding to the property identifier.

14. A computer program product stored in a computer operable media for resource interfacing, said computer program product comprising:
means for receiving a request, the request corresponding to a property;
means for selecting an access mechanism corresponding to the property from a plurality of access mechanisms, wherein each of the plurality of access mechanisms corresponds to a different programming model;
means for identifying a mapping string corresponding to the property;
means for combining the access mechanism with the mapping string, the combination resulting in a property request; and
means for performing the property request.

15. The computer program product as described in claim 14 wherein the access mechanism is selected from the group consisting of a command instrumentation library type and an object instrumentation library type.

16. The computer program product as described in claim 14 wherein the access mechanism is a command instrumentation library type and wherein the mapping string includes an access path.

17. The computer program product as described in claim 14 wherein the access mechanism is an object instrumentation library type and wherein the mapping string includes a translation table.

18. The computer program product as described in claim 14 wherein the request includes a property identifier, the computer program product further comprising:
means for locating the property identifier in an access table; and
means for retrieving the access mechanism and the mapping string from the access table based upon the located property identifier.

19. The computer program product as described in claim 14 further comprising:
means for receiving a property registration request, the property registration request including a property identifier;
means for storing the property identifier in an access table, the property identifier corresponding to a new property;
means for selecting a different access mechanism included in the plurality of access mechanisms for the property identifier, the different access mechanism corresponding to an access mechanism identifier;
means for generating a different mapping string corresponding to the new property, the different mapping string corresponding to a mapping string identifier; and
means for storing the mapping string identifier and the access mechanism identifier in the access table corresponding to the property identifier.

20. The computer program product as described in claim 19 wherein the selecting further comprises:
means for determining that a valid access mechanism does not exist;
receiving access mechanism characteristics corresponding to the property registration request in response to the determination; and
generating the different access mechanism using the access mechanism characteristics.

21. A computer-implemented method for managing a resource, said method comprising:
receiving a request wherein the request includes a property identifier, the request corresponding to a property;
locating the property identifier in an access table;
retrieving an access mechanism and a mapping string from the access table based upon the located property identifier, the access mechanism selected from a plurality of access mechanisms, each of the plurality of access mechanisms corresponding to a different programming model;
combining the access mechanism with the mapping string, the combination resulting in a property request; and
performing the property request.

22. A computer-implemented method for managing a resource, said method comprising:
receiving a property registration request, the property registration request including a property identifier;
storing the property identifier in an access table, the property identifier corresponding to a property;
selecting an access mechanism from a plurality of access mechanisms for the property identifier, each of the plurality of access mechanisms corresponding to a different programming model and the access mechanism corresponding to an access mechanism identifier;
generating a mapping string corresponding to the property, the mapping string corresponding to a mapping string identifier;
storing the mapping string identifier and the access mechanism identifier in the access table corresponding to the property identifier;
receiving a request, the request corresponding to the property;
retrieving the selected access mechanism and the mapping string corresponding to the property;
combining the access mechanism with the mapping string, the combination resulting in a property request; and performing the property request.

23. An information handling system comprising:
one or more processors;
a memory accessible by the processors;
one or more nonvolatile storage devices accessible by the processors;
a resource management tool to interface with a resource, the resource management tool including:
receiving logic for receiving a property registration request, the property registration request including a property identifier;
storage logic for storing the property identifier in an access table, the property identifier corresponding to a property;

selection logic for selecting an access mechanism from a plurality of access mechanisms for the property identifier, each of the plurality of access mechanisms corresponding to a different programming model, the access mechanism corresponding to an access mechanism identifier;

generation logic for generating a mapping string corresponding to the property, the mapping string corresponding to a mapping string identifier;

storage logic for storing the mapping string identifier and the access mechanism identifier in the access table corresponding to the property identifier;

receiving logic for receiving a request, the request corresponding to the property;

retrieval logic for retrieving the selected access mechanism and the mapping string corresponding to the property;

combination logic for combining the access mechanism with the mapping string, the combination resulting in a property request; and invocation logic for invoking the property request.

24. A computer program product stored in a computer operable media for resource interfacing, said computer program product comprising:

means for receiving a request wherein the request includes a property identifier, the request corresponding to a property;

means for locating the property identifier in an access table;

means for retrieving an access mechanism and a mapping string from the access table based upon the located property identifier, the access mechanism selected from a plurality of access mechanisms, each of the plurality of access mechanisms corresponding to a different programming model;

means for combining the access mechanism with the mapping string, the combination resulting in a property request; and means for performing the property request.

25. A computer program product stored in a computer operable media for resource interfacing, said computer program product comprising:

means for receiving a property registration request, the property registration request including a property identifier;

means for storing the property identifier in an access table, the property identifier corresponding to a property;

means for selecting an access mechanism from a plurality of access mechanisms for the property identifier, each of the plurality of access mechanisms corresponding to a different programming model and the access mechanism corresponding to an access mechanism identifier;

means for generating a mapping string corresponding to the property, the mapping string corresponding to a mapping string identifier;

means for storing the mapping string identifier and the access mechanism identifier in the access table corresponding to the property identifier;

means for receiving a request, the request corresponding to the property;

means for retrieving the selected access mechanism and the mapping string corresponding to the property;

means for combining the access mechanism with the mapping string, the combination resulting in a property request; and means for performing the property request.

* * * * *